W. M. Rumrill.
Churn.
Nº 88,078.      Patented Mar. 23, 1869.
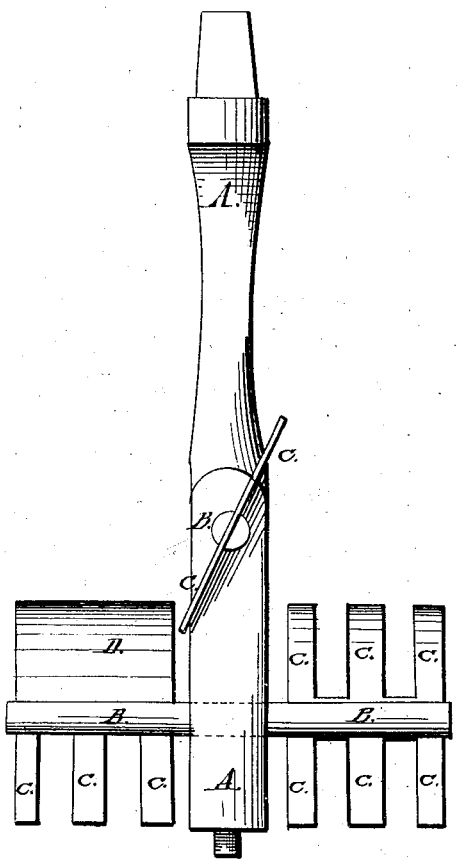
Witnesses:
A. W. Almquist
Wm. A. Morgan
Inventor:
Wm. M. Rumrill
by Munn & Co.
Attorneys

WILLIAM M. RUMRILL, OF ROANOKE, INDIANA.

Letters Patent No. 88,078, dated March 23, 1869.

IMPROVEMENT IN CHURNS.

The Schedule referred to in these Letters Patent and making part of the same.

*To all whom it may concern:*

Be it known that I, WILLIAM M. RUMRILL, of Roanoke, in the county of Huntington, and State of Indiana, have invented a new and useful Improvement in Churns; and I do hereby declare that the following is a full, clear, and exact description thereof, which will enable others skilled in the art to make and use the same, reference being had to the accompanying drawings, forming part of this specification, in which the figure is a side view of my improved churn-dasher.

My invention has for its object to furnish an improved churn-dasher, which shall be so constructed and arranged as to bring the butter quicker and in greater quantities than ordinary churns, and at the same time gathering it as it is developed from the cream; and It consists in the construction and combination of the various parts, as hereinafter more fully described.

A is the dasher-shaft, which passes up vertically through a hole in the centre of the churn-cover, and the lower end of which is pivoted to the centre of the bottom of the churn.

The dasher is operated by means of a crank and bevel-gearing connected with its upper end.

To the lower part of the shaft A are attached two arms B, at right angles to each other, at different elevations, and projecting at each side of said shaft.

To the arms B are attached upwardly and downwardly-projecting floats C, which are slotted at right angles to the arms B, and which are set in an inclined position, the floats C of the one arm inclining in an opposite direction from the floats C of the other arm.

The upper floats D, upon one end of one or both the arms B, are made close, or without slots, as shown in the figure, so as to gather the butter as it is developed from the cream.

By this construction of the dasher, the floats of the one arm tending to force the cream upward, and the floats of the other arm tending to force the cream downward, in connection with the slots in said floats, the cream is divided up into currents, which meet and are broken up, so as to throw the cream into a violent agitation, bringing the butter in a much shorter time, and in greater quantities than is possible with dashers otherwise constructed.

Having thus described my invention,

I claim as new, and desire to secure by Letters Patent—

The arms B, arranged at right angles to each other, at different heights upon the dasher A, when provided with the butter-gatherers D and the floats C C, slotted at right angles to said arms, as herein described for the purpose specified.

The above specification of my invention signed by me, this 11th day of December, 1868.

WM. M. RUMRILL.

Witnesses:
 W. A. BAHAM,
 A. M. DIMIN.